United States Patent
Schork

(10) Patent No.: US 10,998,718 B2
(45) Date of Patent: May 4, 2021

(54) LIGHTNING AND OVERVOLTAGE PROTECTION DEVICE FOR DATA NETWORKS, TELEPHONY SERVICES, ELECTROACOUSTIC INSTALLATIONS OR BUS SYSTEMS

(71) Applicant: DEHN SE + CO KG, Neumarkt/Opf. (DE)

(72) Inventor: Franz Schork, Nuremberg (DE)

(73) Assignee: DEHN SE + CO KG, Neumarkt/Opf. (DE)

( * ) Notice: Subject to any disclaimer, the term of this patent is extended or adjusted under 35 U.S.C. 154(b) by 35 days.

(21) Appl. No.: 16/500,034

(22) PCT Filed: Mar. 12, 2018

(86) PCT No.: PCT/EP2018/056014
§ 371 (c)(1),
(2) Date: Oct. 1, 2019

(87) PCT Pub. No.: WO2018/192713
PCT Pub. Date: Oct. 25, 2018

(65) Prior Publication Data
US 2020/0185912 A1    Jun. 11, 2020

(30) Foreign Application Priority Data

Apr. 20, 2017  (DE) .......................... 102017108448.7
Nov. 9, 2017  (DE) .......................... 102017126263.6

(51) Int. Cl.
*H02H 9/04* (2006.01)
*H01T 1/20* (2006.01)
*H01T 4/10* (2006.01)

(52) U.S. Cl.
CPC ................. *H02H 9/04* (2013.01); *H01T 1/20* (2013.01); *H01T 4/10* (2013.01)

(58) Field of Classification Search
CPC ... H02H 9/04; H02H 9/02; H02H 9/06; H01T 1/20; H01T 4/10; H01T 15/00; H01T 4/12
(Continued)

(56) References Cited

U.S. PATENT DOCUMENTS

| 10,356,001 | B1* | 7/2019 | Drakulic ............... A61B 5/363 |
| 2011/0256770 | A1 | 10/2011 | Opitz et al. ............. 439/620.15 |
| 2015/0077889 | A1* | 3/2015 | Kauffman .............. H03H 7/075 361/56 |
| 2016/0351327 | A1* | 12/2016 | Shigematsu ........... H01F 17/00 |

FOREIGN PATENT DOCUMENTS

| DE | 2137344 A1 | 2/1973 | ............... H02H 9/06 |
| DE | 2137344 B2 | 9/1976 | ............... H02H 9/06 |
| EP | 2381542 A1 | 10/2011 | ............. H01R 12/72 |

OTHER PUBLICATIONS

Notification Concerning Transmittal of International Preliminary Report on Patentability (Chapter I of the Patent Cooperation Treaty), in English, dated Oct. 31, 2019, which was issued by the International Bureau of WIPO in Applicant's corresponding international PCT application having Serial No. PCT/EP2018/056014, filed on Mar. 12, 2018.
(Continued)

*Primary Examiner* — Dharti H Patel
(74) *Attorney, Agent, or Firm* — Bodner & O'Rourke, LLP; Gerald T. Bodner; Christian P. Bodner

(57) ABSTRACT

The invention relates to a lightning and overvoltage protection device for data networks, telephony services, electroacoustic installations or bus systems having at least two grid-side input terminals and at least two output terminals, to which the load that is to be protected can be connected, furthermore having a gas-discharge surge arrester that connects the input terminals and an inductance located between the respective input and output terminal. According to the invention, the inductances are configured as current-compensated inductors having a core and a primary winding and
(Continued)

a secondary winding, wherein the load current flows through the windings in different directions so that the respective magnetic fields cancel out. In the event of transient overvoltages, the arising surge current is bypassed by means of a switching device that then closes at one of the two windings, for example the secondary winding, in such a way that, owing to the winding through which current flows, for example the primary winding, the core reaches saturation and the coupling between the windings is released, with the result that no voltage is established across the load and the voltage applied to the winding through which current flows ignites the gas-discharge surge arrester.

9 Claims, 2 Drawing Sheets

(58) Field of Classification Search
USPC ........................................................ 361/91.1
See application file for complete search history.

(56) References Cited

OTHER PUBLICATIONS

English translation of the International Preliminary Report on Patentability (Chapter I of the Patent Cooperation Treaty), dated Oct. 22, 2019, which was issued by the International Bureau of WIPO in Applicant's corresponding international PCT application having Serial No. PCT/EP2018/056014, filed on Mar. 12, 2018.

Written Opinion of the International Searching Authority, in English, dated Jun. 11, 2018, which was issued by the International Bureau of WIPO in Applicant's corresponding international PCT application having Serial No. PCT/EP2018/056014, filed on Mar. 12, 2018.

International Search Report, in English, dated Jun. 11, 2018, which was issued by the International Bureau of WIPO in Applicant's corresponding international PCT application having U.S. Appl. No. PCT/EP2018/056014, filed on Mar. 12, 2018.

* cited by examiner

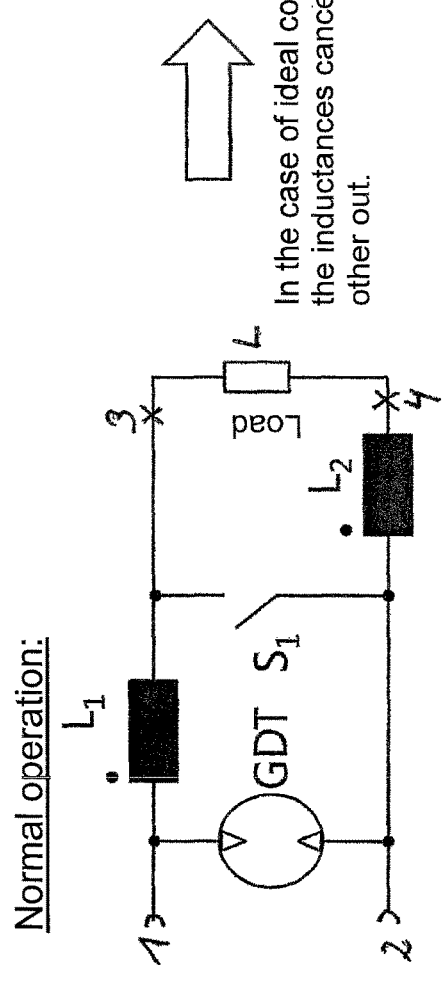

LIGHTNING AND OVERVOLTAGE PROTECTION DEVICE FOR DATA NETWORKS, TELEPHONY SERVICES, ELECTROACOUSTIC INSTALLATIONS OR BUS SYSTEMS

The invention relates to a lightning and overvoltage protection device for data networks, telephony services, electroacoustic systems or bus systems, having at least two grid-side input terminals and at least two output terminals, to which the load to be protected can be connected, furthermore having a gas-discharge surge arrester connecting the input terminals and an inductance according to claim 1 which is located between the respective input and output terminals.

In data networks and in measurement control and regulation technology, there is a multitude of interfaces with different requirements for the performance of the necessary overvoltage protection components.

In addition to protecting the relevant interface against lightning and surge voltages, the surge arresters used must also be able to transmit the system-relevant signal parameters.

Known protection modules, in particular for data networks, telephony services, electroacoustic installations, bus systems or the like, have gas-discharge arresters located between the input terminals, wherein inductors are connected in each case between the input and output terminals. Depending on the embodiment of the overvoltage fine limitation, either wire to earth or wire to wire for protection against unbalanced or balanced interference, TVS diodes are still connected between the output terminals or between an output terminal and earth.

The prior art in this field is characterized by the BLITZ-DUCTOR® modules from DEHN+SÖHNE GmbH+Co KG, Neumarkt/Oberpfalz.

A disadvantage when using the well-known BLITZDUCTOR® devices is the longitudinal inductance, which is particularly disadvantageous in continuous operation, as a non-negligible power loss occurs with ohmic decoupling. Furthermore, protection against common-mode interference is not possible without the use of additional circuit components.

From the above it is therefore the object of the invention to specify a further developed lightning and overvoltage protection device for data networks, telephony services, electroacoustic systems, bus systems or similar applications, which avoids the disadvantages of the prior art and furthermore creates the possibility of carrying higher currents by being able to extinguish the used gas-discharge surge arresters after an overvoltage event.

The object of the invention is solved by the combination of features according to claim 1, wherein the subclaims include at least appropriate embodiments and further developments.

According to the invention, the inductances of the well-known lightning and overvoltage protection device, which are usually designed as ohmic resistors, are replaced by a current-compensated inductor having a core, wherein the current-compensated inductor has a primary winding and a secondary winding.

A current-compensated inductor has several identical windings through which the working current flows in opposite directions, so that its magnetic fields cancel each other out in the core of the inductor. The use of current-compensated inductors for damping interference emissions is well known. In many cases, interference currents occur in the same direction in the outgoing and return lines. For such common-mode interference, a current-compensated inductor can form a very high inductance, since the interference currents are not compensated therein.

In the case of the further developed lightning and overvoltage protection device according to the invention, the primary winding and the secondary winding of the current-compensated inductor are connected in such a way that the load current flows through the windings in different directions so that the respective magnetic fields cancel each other out.

In the event of transient overvoltages, according to the invention, the surge current is guided past one of the two windings by means of a switching device which then closes. Here, for example, the switching device can be designed in such a way that in the event of transient overvoltages, the current continues to flow through the primary winding $L_1$, whereas the secondary winding $L_2$ is not subject to any current load.

Due to the current flowing through the winding, in this case due to the current flow in the primary winding when the switching device is closed, the winding core reaches saturation and the coupling between primary and secondary winding is almost eliminated with the result that no voltage is built up across the load. The current change in the primary winding leads to a voltage and ensures that the gas-discharge surge arrester ignites with the result that the desired overvoltage protection occurs. A retroactive effect of the primary current change on the secondary side is excluded because of the saturated core.

In a preferred further development of the invention, the switching device is formed as a semiconductor, in particular as a MOSFET. The base of the semiconductor or the gate of the semiconductor is connected to one of the input terminals, in particular to the input terminal to which the primary winding of the current-compensated inductors is connected.

In a further development of the invention, an IGBT with a free-wheeling diode can be used as a MOSFET. In principle, it is still possible to implement the switching device on the basis of two antiparallel IGBTs with a series diode. The switching device must be bipolar in design in order to control both positive and negative overvoltages.

After discharging the overvoltage or surge current, the gas-discharge surge arrester can be extinguished by opening the switching device so that the protective device is ready for operation again.

The winding core is preferably realized as a toroidal core.

The desired protection level can be specified or set via the response behavior of the switching device.

In this respect, fine protection is provided by the semiconductor as a switching device.

At least the primary winding, i.e. the winding through which current continues to flow when the switching device is closed, has an effective inductance of ≥2 µH.

The winding core of the current-compensated inductor has as small a volume as possible in order to quickly convert the core to saturation when the switching device switches to the closed state.

In a further development of the invention, the base or gate of the semiconductor is connected via a TVS diode to the relevant input terminal, wherein the protection level and the switching point for the semiconductor can be determined via the diode.

With the solution according to the invention it is not only possible to provide protection in the sense of a filter against common-mode interference by using a current-compensated inductor, but a cascadable protective device is also created which quickly and safely decouples the connected load from transient overvoltages and/or surge currents and simultaneously suppresses the overvoltage event in question by activating the gas-discharge surge arrester. By selecting the inductances, in particular the primary winding, a sufficiently high voltage can be built up to safely ignite the gas-discharge surge arrester.

Since the respective inductances of the windings of the current-compensated inductor are significantly smaller than those of the prior art, the power dissipation in continuous operation is significantly lower.

The current-compensated inductor used is quasi controlled by the semiconductor as the preferred switching device, so that the inductor switches as quickly as possible to the saturation state under pulse load in order to cancel the magnetic negative feedback and at the same time ensure that the inductance on the primary side increases.

The implementation of the current-compensated inductor is also carried out in relation to the selection of the core in such a way that the magnetic field lines on the primary side no longer reach the secondary side when the core is saturated.

In summary, the essence of the invention can be seen in the application of current-compensated inductors, which are preferably controlled on the primary winding side in such a way that in the event of overvoltage, the secondary winding is freed from current flow by a switching device. In normal continuous operation, the load current flows through the coupled inductors in different directions with the result that the magnetic fields of the two coils are eliminated, resulting in only a low series inductance.

In the event of a transient overvoltage, the surge current is conducted through the semiconductor switch past the secondary inductor, which means that the magnetic fields no longer cancel each other out and the inductance in the inductor circuit increases.

The high inductance causes a voltage to build up over the gas-discharge surge arrester, which ignites it in the desired manner. After the overvoltage event, the gas-discharge surge arrester can be extinguished by the semiconductor switch, which makes it possible to use the solution according to the invention even at high rated currents.

The invention will be explained in more detail below with reference to an embodiment example and the drawings, wherein:

FIG. 1a shows a schematic diagram of the lightning and overvoltage protection device according to the invention in normal operation with open switching device $S_1$;

FIG. 1b shows an ideal equivalent circuit diagram in normal operation with open switching device $S_1$;

Figure 2B:
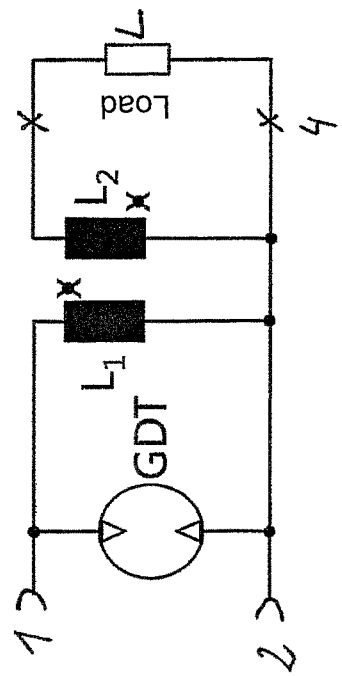
FIG. 2b an equivalent circuit diagram in the event of overvoltage and given saturation of the primary winding $L_1$.

The lightning and overvoltage protection device according to the invention as shown in the figures is based on two input terminals 1 and 2, wherein a load is connected to output terminals 3, 4.

In addition, a gas-discharge surge arrester GDT connecting input terminals 1; 2 is provided.

The primary winding $L_1$ of a current-compensated inductor with core is disposed between input terminal 1 and output terminal 3.

The secondary winding $L_2$ of the current compensated inductor is located between input terminal 2 and output terminal 4.

Furthermore, a switching device $S_1$ is connected to output terminal 3 and input terminal 2, which is open during normal operation.

Due to the design of the primary winding $L_1$ and the secondary winding $L_2$ as current-compensated inductors with core, the inductances cancel each other out with the desired ideal coupling, so that the equivalent circuit diagram shown in FIG. 1b results. The relevant relationships to negative feedback and coupling k are explained in FIGS. 1a and 1b.

Figure 2A:
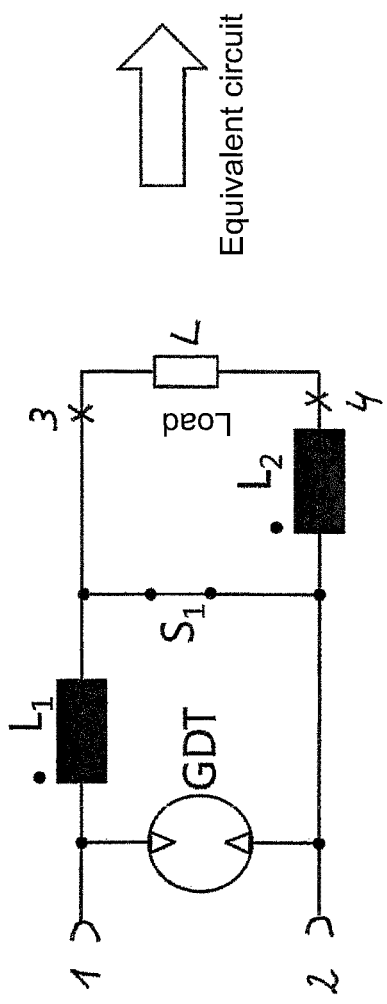
FIG. 2a shows a schematic diagram of the lightning and overvoltage protection device according to the invention with closed switching device $S_1$.

In the event of overvoltage, as shown in FIGS. 2a and 2b, the switching device $S_1$, which is preferably designed as a semiconductor switch and preferably as an IGBT, is closed. As a result, a high current flows through the primary winding $L_1$, which drives the winding core into saturation. This removes the coupling k between the primary winding $L_1$ and the secondary winding $L_2$.

In the case of saturation, no energy is transmitted from the primary side to the secondary side of the current-compensated inductor, i.e. no voltage is built up above the load.

The remaining residual inductance from the primary winding $L_1$ builds up a high voltage which ignites the gas-discharge surge arrester GDT in the desired manner.

The corresponding ideal equivalent circuit diagram in the event of overvoltage at saturation is shown in FIG. 2b.

The winding core of the current-compensated inductor is dimensioned so that the coupling k is close to 1 in normal operation and close to 0 in overvoltage conditions.

In order to cancel the inductive coupling as quickly as possible in the event of an interference pulse, it is necessary to drive the core of the inductor into saturation as quickly as possible in the event of an overvoltage. In order to achieve this, the following dimensioning parameters have been developed on the basis of extensive investigations with different cores. On the one hand, the core volume must be kept as small as possible in order to achieve rapid saturation. When dimensioning the windings, it must also be ensured that they do not overlap, i.e. that in the case of saturation the secondary inductance is not interspersed by the field lines of the primary inductance. A low coupling in case of saturation is advantageous.

Furthermore, an embodiment is advantageous in which the windings are rotated by 90° so that the field lines no longer intersect the secondary coil vertically when saturated. For this purpose, specially manufactured cores are used, which are turned in themselves.

The invention claimed is:

1. Lightning and overvoltage protection device for data networks, telephony services, electroacoustic systems or bus systems, having at least two grid-side input terminals (1; 2) and at least two output terminals (3; 4) to which the load (L) to be protected can be connected, furthermore having a gas-discharge surge arrester (GDT) that connects the input terminals (1; 2) and an inductance located between the respective input and output terminals (1; 3/2; 4), characterized in that the inductances are designed as current-compensated inductors having a core and a primary winding ($L_1$) and a secondary winding ($L_2$), wherein the load current flows through the windings ($L_1$; $L_2$) in different directions, so that the respective magnetic fields cancel each other out and, in the event of transient overvoltages, the arising surge current is conducted past one of the two windings ($L_2$) by means of a switching device ($S_1$) which then closes, in such a way that the core reaches saturation through the current-carrying winding ($L_1$) and the coupling (k) between the windings ($L_1$; $L_2$) is cancelled, with the result that no voltage is built up across the load (L) and the voltage applied to the current-carrying winding ($L_1$) ignites the gas-discharge surge arrester (GDT).

2. Lightning and overvoltage protection device according to claim 1, characterized in that the switching device ($S_1$) is designed as a semiconductor switch, wherein the base or gate thereof is connected to one of the input terminals (1).

3. Lightning and overvoltage protection device according to claim 2, characterized in that the semiconductor switch is designed as an IGBT.

4. Lightning and overvoltage protection device according to claim 2, characterized in that the base or the gate of the semiconductor switch is connected to the input terminal (1) via a TVS diode.

5. Lightning and overvoltage protection device according to claim 1, characterized in that the gas-discharge surge arrester (GDT) can be extinguished by opening the switching device ($S_1$).

6. Lightning and overvoltage protection device according to claim 1, characterized in that the core of the current-compensated inductors is designed as a toroidal core.

7. Lightning and overvoltage protection device according to claim 1, characterized in that the respective protection level of the overall device can be predetermined via the response behavior of the switching device ($S_1$).

8. Lightning and overvoltage protection device according to claim 1, characterized in that the winding ($L_1$) through which current continues to flow in the case of the closed switching device ($S_1$) has an effective inductance of $\geq 2$ µH.

9. Lightning and overvoltage protection device according to claim 1, characterized in that the core of the current-carrying inductor has a small volume for achieving rapid saturation.

\* \* \* \* \*